United States Patent Office

2,980,637
Patented Apr. 18, 1961

2,980,637
COATING COMPOSITIONS CONTAINING AMINOPLAST RESINS

Harry M. Culbertson, Wilbraham, Mass., and Byron L. Williams, Jr., Texas City, Tex., assignors to Monsanto Chemical Company, St. Louis, Mo., a corporation of Delaware No Drawing. Filed Dec. 4, 1957, Ser. No. 700,547

6 Claims. (Cl. 260—21)

This invention relates to novel aminoplast resins which are particularly suitable for use in protective coating compositions. More particularly, the invention relates to etherified condensation products of an N-substituted melamine of the group consisting of N,N'-dialkylmelamines, N,N'N''-trialkylmelamines and mixtures thereof and formaldehyde. The invention further relates to protective coating compositions containing such novel aminoplast resins.

BACKGROUND OF THE INVENTION

Etherified melamine-formaldehyde resins have utility in many industrial fields including the protective coating arts. In particular, protective coating compositions containing blends of such etherified melamine-formaldehyde resins and oil-modified alkyd resins have been widely used as baking enamels. Such protective coating compositions have the desirable characteristics of moderately rapid cure, good color retention and good chemical resistance. However, the etherified melamine-formaldehyde resins have limited compatibility with the oil-modified alkyd resins and impair the gloss of the ultimate coatings when used in substantial quantities to effect the maximum improvement in other film properties. The compatibility of etherified melamine-formaldehyde resins with oil-modified alkyd resins can be improved by modifying the etherified melamine-formaldehyde resins with other compounds such as arylsulfonamides. Such modification of the etherified melamine-formaldehyde resins, while improving the resins' compatibility with oil-modified alkyd resins, adversely affects other properties of the protective coating compositions, particularly the rate of cure. Thus, in preparing protective coating compositions containing an etherified melamine-formaldehyde resin, the art must choose between formulations having fast cures and low gloss or formulations having good gloss, but slow cures and low detergent resistance.

Accordingly, it is an object of this invention to provide novel aminoplast resins having improved properties.

Another object of the invention is to provide novel aminoplast resins which are particularly suitable for use in protective coating compositions.

A further object of the invention is to provide novel aminoplast resins which are compatible with oil-modified alkyd resins of all oil lengths.

Yet another object of this invention is to provide protective coating compositions containing novel aminoplast resins.

Other objects and advantages of the invention will be apparent from the following detailed descriptions thereof.

SUMMARY OF THE INVENTION

In accordance with this invention there are provided novel aminoplast resins which comprise an etherified reaction product of at least 3 mols of a monohydric alcohol containing 1–6 carbon atoms and a condensation product of 1 mol of an N-substituted melamine of the group consisting of N,N'-dialkylmelamines, N,N',N''-trialkylmelamines and mixtures thereof and at least 1 mol of formaldehyde. In another embodiment of the invention there are provided novel protective coating compositions which contain an aminoplast resin of the type described above and an oil-modified alkyd resin. The invention further relates to protective coating compositions containing (1) an aminoplast resin of the type described above, (2) an etherified melamine-formaldehyde resin and (3) an oil-modified alkyd resin.

EXPERIMENTAL

The following examples are set forth to illustrate more clearly the principle and practice of this invention to those skilled in the art. Unless otherwise stated, where quantities are mentioned they are parts by weight.

Example I

Reactants consisting of 170 parts (1.0 mol) of N,N'N''-trimethylmelamine, 325 parts (4 mols) of formalin (37% formaldehyde), 600 parts (8 mols) of n-butanol and 4 parts of a 5% aqueous NaOH solution are charged to a reaction vessel equipped with a stirrer and a condenser that is fitted with a decanting esterification head. The alkaline solution (pH=10.5) is refluxed for 1.0 hour with all of the condensate being returned to the reaction flask.

After adjusting the pH of the system to 6.4 with oxalic acid, the reaction mixture is again heated to reflux. During this phase of the reaction, the decanting head is set to continuously remove the water phase which separates in the distillation head and to return the butanol phase to the reaction flask. A total of 200 parts of water phase is removed over a 4-hour period. The balance of the water remaining in the reaction mixture is removed by refluxing the reaction mixture with the esterification head being set for total takeoff. The distillation is continued until the boiling point of the distillate rises to 108° C. This step requires about 0.5 hour. As the distillate is removed, an equivalent quantity of dry butanol is continuously added to the reaction flask. After cooling, the butanol is removed by vacuum distillation and the resin is recovered as a heavy viscous liquid.

Examples II–XII

Eleven resins are prepared by the procedure of Example I except that the N,N'N''-trimethylmelamine is replaced with a stoichiometrically equivalent quantity of 11 different N-alkyl substituted melamines as indicated in Table I.

TABLE I

| Example | N-substituted Melamine Employed |
|---|---|
| II | N,N',N''-Tri-n-butylmelamine. |
| III | N,N',N''-Tri-tert-butylmelamine. |
| IV | N,N',N''-Tri-(1,1,3,3 tetramethylbutyl)melamine. |
| V | N,N',N''-Tri-sec-butylmelamine. |
| VI | N,N'-Dimethyl-N-octadecylmelamine. |
| VII | N,N'-Dimethylmelamine. |
| VIII | N,N'-Di-n-butylmelamine. |
| IX | N,N'-Di-tert-butylmelamine. |
| X | N,N'-Di(1,1,3,3 tetramethylbutyl) melamine. |
| XI | N,N'-Di-sec-butylmelamine. |
| XII | N-Methyl-N'-octadecylmelamine. |

Examples XIII–XXIV

Examples I–XII are repeated except that isobutanol is employed in lieu of n-butanol.

Example XXV

The following protective coating compositions are prepared in which the figures listed are parts by weight:

TABLE II.—COATING COMPOSITION

| Component | A | B | C | D | E | F | G | H | I | J | Control I | Control II |
|---|---|---|---|---|---|---|---|---|---|---|---|---|
| Resin of Example I | 1 | 2 | | | | | | | | | | |
| Resin of Example II | | | 1 | 2 | | | | | | | | |
| Resin of Example III | | | | | 1 | 2 | | | | | | |
| Resin of Example IV | | | | | | | 1 | 2 | | | | |
| Resin of Example V | | | | | | | | | 1 | | | |
| Resin of Example VI | | | | | | | | | | 1 | | |
| Isobutyl Ether of a Melamine-Formaldehyde Resin | 9 | 8 | 9 | 8 | 9 | 8 | 9 | 8 | 9 | 9 | | |
| Prior Art Resin 1 | | | | | | | | | | | 10 | |
| Prior Art Resin 2 | | | | | | | | | | | | 10 |
| Alkyd Resin | 20 | 20 | 20 | 20 | 20 | 20 | 20 | 20 | 20 | 20 | 20 | 20 |
| Titanium Dioxide | 25 | 25 | 25 | 25 | 25 | 25 | 25 | 25 | 25 | 25 | 25 | 25 |
| Butanol | 5 | 5 | 5 | 5 | 5 | 5 | 5 | 5 | 5 | 5 | 5 | 5 |
| Xylol | 40 | 40 | 40 | 40 | 40 | 40 | 40 | 40 | 40 | 40 | 40 | 40 |

The alkyd resin included in the above compositions consists of a blend of two parts of a glyceryl phthalate resin modified with 35 weight percent of coconut oil fatty acids and one part of a glyceryl phthalate resin modified with 40 weight percent of soybean oil fatty acids. Prior art Resin 1 included in Control I is a commercially available butyl ether of a melamine-formaldehyde resin. Prior art Resin 2 included in Control II is a commercially available butyl ether of a melamine-formaldehyde resin that is modified with 0.32 mol of toluene sulfonamide per mol of melamine. The isobutyl ether of the melamine-formaldehyde resin is prepared by refluxing an acidic solution (pH=5.8–6.4) of 1 mol of hexamethylol melamine in 8 mols of isobutanol.

Several series of steel panels are spray-coated with each of the above described coating compositions. The coatings are cured by heating for, respectively, 1 hour at 180° F., 30 minutes at 225° F., and 20 minutes at 300° F. to obtain films 2 mils thick. The Sward hardness of each of the films is measured and, at each curing condition, the films obtained with the experimental coating compositions are harder than the films obtained with the 2 control compositions. The detergent resistance of the films cured for 20 minutes at 300° F. is measured by ASTM Method D714–45 and the films prepared from the experimental coating compositions are superior to the films prepared from the 2 control compositions.

The above data indicate that the experimental coating compositions, as compared with the control coating compositions containing the prior art melamine coating resins, (1) cure faster, (2) provide harder films and (3) provide films having superior detergent resistance.

Example XXVI

Additional steel panels are spray coated with the coating compositions described in Example XXV. One series of the panels is cured for 20 minutes at 300° F. and a second series of the panels is baked for 16 hours at 300° F. The panels are examined visually and within each series the gloss obtained with the experimental coating compositions is at least equal to and in some cases superior to the gloss obtained from the two control compositions. These data establish that the initial gloss and the gloss retention on overbaking of the experimental coating compositions are fully equivalent to the two control coating compositions. This showing is highly significant, since the control compositions are considered by the art to be excellent with respect to these properties.

Example XXVII

The following protective coating composition is prepared:

| Component: | Parts |
|---|---|
| Alkyd resin | 15.0 |
| Resin of Example I | 15.0 |
| Titanium dioxide | 15.0 |
| Lampblack | 0.2 |
| Xylol | 35.0 |
| Butanol | 15.0 |

The alkyd resin included in the above formulation is a glyceryl phthalate resin modified with about 42 weight percent of dehydrated castor oil fatty acids. The coating composition is sprayed onto a steel panel and baked for 20 minutes at 300° F. The resulting film is very hard and has high gloss and good detergent resistance.

Example XXVIII

Eighteen unpigmented, clear baking varnishes are prepared by including each of the resins of Examples VII–XXIV in the following formulation:

| Component: | Parts |
|---|---|
| Alkyd resin | 27.00 |
| Aminoplast resin | 3.00 |
| Hydrocarbon solvent | 50.00 |
| Butanol | 5.00 |
| Cobalt naphthenate | 0.06 |

The alkyd resin included in the formulation is a glyceryl phthalate resin modified with about 62 weight percent of soybean oil fatty acids. The hydrocarbon solvent is a commercial mixture of petroleum aliphatic hydrocarbons. The varnishes are sprayed onto steel panels and baked for 20 minutes at 300° F. to provide hard films having high gloss and good detergent resistance.

DISCUSSION

The aminoplast resins of this invention are the etherified reaction product of at least 3 mols of a monohydric alcohol containing 1–6 carbon atoms and a condensation product of 1 mol of an N-substituted melamine of the group consisting of N,N′-dialkylmelamines, N,N′,N″-trialkylmelamines and mixtures thereof, and at least 1 mol of formaldehyde. In a preferred embodiment of the invention, the aminoplast resins are the etherified reaction product of a butanol and either (1) a condensation product of an N,N′,N″-tri-sec-alkylmelamine and formaldehyde or (2) a condensation product of an N,N′-di-tert-alkylmelamine and formaldehyde.

The condensation products employed in the invention are prepared by heating the N-substituted melamine and the formaldehyde under alkaline conditions, e.g., at a pH of 8.5–10.5, in a suitable solvent such as water, a 1–6 carbon atom monohydric alcohol or a water-alcohol mixture. The minimum quantity of formaldehyde employed is at least 1 mol per mol of N-substituted melamine, but preferably the formaldehyde is employed in a quantity sufficient to react with each of the reactive hydrogen atoms contained in the N-substituted melamine. In calculating the quantity of formaldehyde to be employed, the N,N′-dialkylmelamines contain 4 reactive hydrogen atoms and the N,N′,N″-trialkylmelamines contain 3 reactive hydrogen atoms.

The alkyl groups contained in the N-substituted melamines included in the aminoplast resins of the present invention may be normal alkyl groups, e.g., a methyl group or an ethyl group, secondary alkyl groups, e.g., an isopropyl or a secondary butyl group, or tertiary alkyl groups, e.g., a tertiary butyl group or a tertiary amyl group. As used herein, the term "alkyl group" is limited to acyclic alkyd groups and does not include within its scope cycloalkyl groups. The alkyl substituents of any given N-substituted melamine may be either identical or different. Usually the maximum number of carbon atoms contained in any individual alkyl group will be about 20 and preferably the alkyl constituents are selected so that the total number of carbon atoms contained in all of the alkyl groups does not exceed about 36. Typical N-substituted melamines which may be employed include:

N,N'-diethylmelamine
N,N'-diisopropylmelamine
N,N'-di-sec-amylmelamine
N,N'-di-sec-butylmelamine
N,N'-di-tert-butylmelamine
N,N'-di(1,1,3,3-tetramethylbutyl)melamine
N-isopropyl-N'-dodecylmelamine
N-ethyl-N'-octadecylmelamine
N,N',N''-tri-sec-amylmelamine
N,N',N''-tri-tert-amylmelamine
N,N'-dimethyl-N''-dodecylmelamine
N,N'-diisopropyl-N''-2-ethylhexylmelamine The N-substituted melamines can be prepared by methods which are known in the art. For example, N,N'-dialkylmelamines can be prepared by reacting 2 mols of an appropriate alkylamine with 2,4-dichloro-6-amino-s-triazine. Similarly, N,N',N''-trialkylmelamines can be prepared by reacting 3 mols of an appropriate alkylamine with cyanuric chloride. Alternatively, the N-substituted melamines can be prepared by the method disclosed in U.S. 2,361,823.

The etherified resins are prepared by heating the condensates of the N-substituted melamine and formaldehyde with at least 3 mols of a monohydric alcohol containing 1–6 or preferably 3–6 carbon atoms under acid conditions, e.g., at a pH of about 5.5–7.0. During this reaction, the condensation product is both etherified and polymerized. Thus, the alcohol functions as both a reactant and as a solvent for the reaction. Preferably, the reaction is carried out under reflux conditions (either at atmospheric or reduced pressure) so that water may be removed from the reaction system by azeotropic distillation. To maintain the minimum quantity of alcohol required in the reaction system when operating under reflux conditions, it is necessary to (1) return the distilled alcohol to the reaction system, or (2) add alcohol to the reaction system as makeup, or (3) initially charge a large excess of alcohol to the reaction. Essentially any 1–6 carbon atom monohydric alcohol such as methanol, ethanol, propanol or hexanol may be employed in the etherification reaction. The alcohol employed will be influenced to a large degree by the use that is to be made of the resin. Where the resin is to be employed in protective coating compositions, we prefer to use n-butanol and especially isobutanol for this purpose. When isobutanol is employed as the etherifying alcohol, the pH of the system during the etherification reaction must be maintained within the limits of about 5.8–7.0 or preferably 6.0–6.5. After the etherification reaction is complete, the resin solutions may be concentrated to the desired solids level or recovered in solvent free form by removing the solvent alcohol by vacuum distillation.

The resins of the invention may be used in the manufacture of textile printing pastes, as an ingredient in adhesive formulations, in the resin finishing of textiles (especially cottons) e.g., by methods analogous to those disclosed in U.S. 2,661,262 and U.S. 2,661,313, etc. The resins also may be used per se or in conjunction with other film forming resins in the preparation of protective coating compositions.

The present invention is also concerned with protective coating compositions which contain as the film forming polymers a binary mixture of an aminoplast resin of the type herein described and an oil-modified alkyd resin. The novel aminoplast resins are compatible with alkyd resins of all oil lengths in virtually all proportions. Preferably, however, the resinous components of the coating compositions of primary concern consist of 10–50 weight percent of the aminoplast resin and, correspondingly, 90–50 weight percent of the oil-modified alkyd resin.

The invention further relates to protective coating compositions which contain as the film-forming polymers a ternary mixture of (1) an oil-modified alkyd resin, (2) a novel aminoplast resin of the type herein described and (3) an etherified melamine-formaldehyde resin. The oil-modified alkyd resin ordinarily will constitute 50–90 weight percent of the total of the 3 film-forming polymers. The novel aminoplast resin in turn will constitute at least 5 weight percent and preferably 10–50 weight percent of the binary mixture of the novel aminoplast resin and the etherified melamine-formaldehyde resin.

The etherified melamine-formaldehyde resins included in the protective coating compositions described in the paragraph above are known in the art. Chemically, these resins are the etherified reaction product of at least 4 mols of a monohydric alcohol containing 1–6 or preferably 3–6 carbon atoms and a condensation product of 1 mol of melamine and at least 3 mols of formaldehyde. Preferably, the monohydric alcohol employed to etherify the melamine-formaldehyde condensate is a butanol such as n-butanol or isobutanol. If desired, the etherified melamine-formaldehyde resin may be modified with minor amounts of other compounds containing amino hydrogen atoms, e.g., an aryl sulfonamide.

The alkyd resins included in the protective coating compositions of the present invention are condensates of polyhydric alcohols such as glycols, glycerols, sorbitol, pentaerythritol, etc. with polybasic acids or anhydrides thereof, e.g., phthalic acid, phthalic anhydride, isophthalic acid, maleic acid, maleic anhydride, fumaric acid, adipic acid, azelaic acid, etc. These alkyd resins are modified with drying, semi-drying and non-drying oils such as coconut oil, castor oil, dehydrated castor oil, soybean oil, linseed oil, tung oil, or the acids and glycerides derived therefrom. The oil-modified alkyd resins having the best balance of properties for inclusion in the protective coating compositions of the invention contains 30–70 and preferably 30–40 weight percent of combined fatty acids. As is known, such acids contain about 12–20 carbon atoms.

The protective coating compositions of interest will comprise 20–70% of the mixture of the aminoplast resin (or resins) and the oil-modified alkyd resin dissolved in a suitable organic solvent such as hydrocarbons, alcohols, ethers, ketones, esters, and mixtures thereof, e.g., xylol-butanol and aliphatic hydrocarbon-butanol mixtures. Pigments, driers and other conventional ingredients may be included in the coating compositions. Such compositions usually will be formulated to have a total solids content of about 40–60%.

The coating compositions of the invention may be advantageously employed to protect wooden, paper and metal surfaces. The coating compositions may be applied to the surfaces to be protected by conventional methods of application such as brushing, spraying, roll coating, dipping, etc. The films may be cured by heating for short periods of time at 180–400° F.

The above descriptions and particularly the examples are set forth by way of illustration only. Many other variations and modifications of the invention will be apparent to those skilled in the art and may be employed without departing from the spirit and scope of the invention herein described.

What is claimed is:

1. A protective coating composition comprising an organic solvent solution of a ternary mixture of (1) an oil-modified alkyd resin, (2) an etherified formaldehyde condensate of an N-substituted melamine and (3) an etherified formaldehyde condensate of melamine; said oil-modified alkyd resin constituting 50–90 weight percent of the total of (1), (2) and (3); said etherified formaldehyde condensate of an N-substituted melamine constituting at least 5 weight percent of the total of (2) (3); said etherified formaldehyde condensate of an N-substituted melamine being a resin that is prepared by heating a mixture of at least 3 mols of a monohydric acyclic alcohol containing 1–6 carbon atoms and a condensation product of 1 mol of an N-substituted melamine and at least 1 mol of formaldehyde to substantially atmospheric reflux temperature at a pH of 5.5–7.0 for a period of time sufficient to etherify and polymerize said condensation product of the N-substituted melamine and formaldehyde; said N-substituted melamine being selected from th group consisting of N,N'-dialkylmelamines, N,N',N''-trialkylmelamines and mixtures thereof, the individual alkyl groups of said N-substituted melamines being acyclic and containing a maximum of about 20 carbon atoms and the total number of carbon atoms contained in all of said alkyl groups not exceeding about 36; said etherified formaldehyde condensate of melamine being an etherified reaction product of at least 4 mols of a monohydric acyclic alcohol containing 1–6 carbon atoms and a condensation product of 1 mol of melamine and at least 3 mols of formaldehyde.

2. A protective coating compositoin comprising an organic solvent solution of a ternary mixture of (1) an oil-modified alkyd resin, (2) a butyl ether of a formaldehyde condensate of an N-substituted melamine and (3) a butyl ether of a formaldehyde condensate of melamine; said oil-modified alkyd resin constituting 50–90 weight percent of the total of (1), (2) and (3); said butyl ether of a formaldehyde condensate of an N-substituted melamine constituting at least 5 weight percent of the total of (2) and (3); said butyl ether of a formaldehyde condensate of an N-substituted melamine being a resin that is prepared by heating a mixture of at least 3 mols of a butanol of the group consisting of n-butanol, isobutanol and mixtures thereof and a condensation product of 1 mol of an N-substituted melamine and at least 1 mol of formaldehyde to substantially atmospheric reflux temperature at a pH of 5.5–7.0 for a period of time sufficient to etherify and polymerize said condensation product of the N-substituted melamine and formaldehyde; said N-substituted melamine being selected from the group consisting of N,N'-dialkylmelamines, N,N',N''-trialkylmelamines and mixtures thereof, the individual alkyl groups of said N-substituted melamines being acyclic and containing a maximum of about 20 carbon atoms and the total number of carbon atoms contained in all of said alkyl groups not exceeding about 36; said butyl ether of a formaldehyde condensate of melamine being an etherified reaction product of at least 4 mols of a butanol of the group consisting of n-butanol, isobutanol and mixtures thereof and a condensation product of 1 mol of melamine and at least 3 mols of formaldehyde.

3. A protective coating composition of claim 2 in which the butyl ether of a formaldehyde condensate of an N-substituted melamine is a butyl ether of a formaldehyde condensate of N,N',N''-trimethylmelamine.

4. A protective coating composition of claim 2 in which the butyl ether of a formaldehyde condensate of an N-substituted melamine is a butyl ether of a formaldehyde condensate of N,N',N''-tri-n-butylmelamine.

5. A protective coating composition of claim 2 in which the butyl ether of a formaldehyde condensate of an N-substituted melamine is a butyl ether of a formaldehyde condensate of N,N',N''-tri-tert-butylmelamine.

6. A protective coating composition of claim 2 in which the butyl ether of a formaldehyde condensate of an N-substituted melamine is a butyl ether of a formaldehyde condensate of N,N',N''-tri(1,1,3,3-tetramethylbutyl)melamine.

References Cited in the file of this patent

UNITED STATES PATENTS

| | | |
|---|---|---|
| 2,197,357 | Widmer et al. | Apr. 16, 1940 |
| 2,209,292 | Berger | July 23, 1940 |
| 2,222,350 | Keller | Nov. 19, 1940 |
| 2,294,590 | West | Sept. 1, 1942 |
| 2,361,823 | D'Alelio | Oct. 31, 1944 |
| 2,377,867 | D'Alelio | June 12, 1945 |
| 2,454,495 | Widmer et al. | Nov. 23, 1948 |
| 2,485,059 | Mohrman et al. | Oct. 18, 1949 |
| 2,691,021 | Kaiser et al. | Oct. 5, 1954 |
| 2,809,954 | Kazenas | Oct. 15, 1957 |

OTHER REFERENCES

Hodgins: Melamine-Formaldehyde Film-Forming Compositions, pp. 769–779, Ind. and Eng. Chem., vol. 33, No. 6 (June 1941).